United States Patent [19]
Shikata

[11] Patent Number: 5,218,893
[45] Date of Patent: Jun. 15, 1993

[54] VIBRATION MACHINING METHOD AND CUTTING DEVICE THEREFOR

[75] Inventor: Hiroshi Shikata, Yokohama, Japan

[73] Assignee: Kabushiki Kaisha Toshiba, Kawasaki, Japan

[21] Appl. No.: 913,383

[22] Filed: Jul. 15, 1992

[30] Foreign Application Priority Data

Jul. 17, 1991 [JP] Japan ............... 2-177005

[51] Int. Cl.⁵ .............................. B23B 1/00
[52] U.S. Cl. ................... 82/1.11; 82/904
[58] Field of Search ........... 82/1.11, 132, 158, 173, 82/904; 407/11; 408/700; 409/131

[56] References Cited

U.S. PATENT DOCUMENTS 3,482,360  12/1969  Legge .................. 51/165.9
4,636,117  1/1987  Shikata ................ 407/104

FOREIGN PATENT DOCUMENTS 36-18897  10/1961  Japan .
57-112801  7/1982  Japan .

Primary Examiner—William E. Terrell
Attorney, Agent, or Firm—Oblon, Spivak, McClelland, Maier & Neustadt

[57] ABSTRACT

A vibration machining method and device in which a cutting tool is vibrated as its cutting edge cuts a workpiece. The cutting tool is so positioned that its cutting edge is inclined at a specific angle relative to the cutting speed direction, and the cutting tool is vibrated in a direction along its cutting edge, whereby the cutting fluid is allowed to readily reach the cutting point and there is no necessity of restricting the cutting speed so that the machining efficiency is improved.

22 Claims, 7 Drawing Sheets

VIBRATION MACHINING METHOD AND CUTTING DEVICE THEREFOR

BACKGROUND OF THE INVENTION

1. Field of the Art

This invention relates to a vibration machining method in which cutting of a workpiece is accomplished by imparting vibration to the cutting tool of a cutting device. The invention relates also to a cutting device for the method. More particularly, the invention relates to a method and a device wherein the cutting edge is inclined relative to the cutting direction, and the cutting part of the cutting tool is vibrated along the cutting edge.

2. Prior Art

In general, the vibration cutting method is which cutting is carried out by vibrating a cutting tool in parallel to the cutting speed direction is known (for example, Japanese Patent Publication No. 36-18897). According to this vibration cutting method for the prior art, cutting is accomplished by holding the cutting edge of the cutting tool substantially perpendicularly to the cutting speed direction and vibrating the cutting tool in the direction perpendicular to the cutting edge, that is, in parallel to the cutting speed direction.

By the above described vibration cutting method, limiting the cutting speed is unavoidably necessary in order to enable the cutting fluid to infiltrate and flow between the chip and the cutting tool face during cutting. That is, the cutting speed v must satisfy the following conditional relationship.

$$v < 2\pi af.$$

where
- a is the vibrational amplitude, and
- f is the vibrational frequency.

Furthermore, high power has been necessary for vibrating the cutting tool in the direction perpendicular to its cutting edge. Accordingly, a cutting tool having a cutting edge of narrow width and a sharp point has been generally used.

In the above described known method of vibration cutting, the workpieace is cut by vibrating the cutting tool of sharp point in a manner to satisfy the conditional relationship set forth hereinbefore. For this reason, it has been necessary to use a low cutting speed and, moreover, a low rate of feed. Consequently there has been the problem of low machining efficiency.

Furthermore, high power has been required to impart vibration. Consequently the power efficiency for machining has been low. Moreover, the serviceable life of the cutting tool is shortened.

SUMMARY OF THE INVENTION

Accordingly, an object of this invention is to provide a vibration machining method by which a high cutting speed can be attained with low cutting power, and the serviceable life of the cutting tool can be prolonged. Another object of the invention is to provide a cutting device for practicing the vibration machining method.

The first object stated above has been achieved by the present invention, according to one aspect thereof, briefly summarized, there is provided a vibration machining method including feeding a cutting edge of a cutting tool relative to a workpiece so as to produce a cutting speed between the cutting edge and the workpiece, and carrying out cutting of said workpiece as said cutting tool is vibrated, said method comprising the steps of positioning the cutting tool such that the cutting edge is inclined at a specific angle relative to the direction of the cutting speed; and vibrating the cutting tool in a direction along the cutting edge.

According to another aspect of the invention, there is provided a cutting device of a machine tool, said cutting device being provided with means for supporting a workpiece, a cutting tool having a cutting edge for cutting said workpiece, means for moving the workpiece and cutting tool relatively to each other to produce a cutting speed between the cutting edge and the workpiece and to carry out cutting, and vibration-imparting means for vibrating said cutting tool during the cutting: the cutting device comprising support means for so supporting the cutting tool that the cutting edge thereof is inclined at a specific angle relative to the direction of the cutting speed; and said vibration-imparting means vibrating the cutting tool in a direction along the cutting edge thereof.

In the vibration machining method and the cutting device thereof of this invention, the body of the cutting device is so held that the cutting edge of the cutting tool is inclined at a specific angle relative to the cutting speed direction. A vibration-imparting means for vibrating the cutting tool along its curting edge is placed in abutting contact with a part of the cutting device, and cutting is carried out as the cutting tool is vibrated along its cutting edge. For this reason, the cutting fluid, in a broad sense including air, can infiltrate readily to the cutting point irrespective of the vibratory velocity or the cutting speed of the cutting tool. Therefore there is no restriction of the cutting speed v according to the restrictive relationship $v < 2\pi af$ mentioned hereinbefore and existing hitherto. For this reason, in accordance with the vibration machining method and the cutting device therefor according to this invention, a high cutting speed can be freely selected, so that a high machining efficiency can be achieved.

Another significant feature of the method and device of this invention is that the cutting edge of the cutting tool is inclined at an angle relative to the cutting speed direction, and at the same time the cutting tool is vibrated in the direction along the cutting edge. For this reason, the vibration of the cutting tool is not counter to the force component in the cutting speed direction of the workpiece. As a result, the resistance to cutting action imparted from the workpiece to the cutting device during cutting is low. Therefore the power required to vibrate the cutting tool is low. Because the power required for the cutting resistance and for imparting vibration is low, the width of the cutting edge of the cutting tool can be made large. With a wide cutting edge, the feed rate of the cutting device becomes high. The resulting high cutting speed leads to a high cutting efficiency. As another result of a low cutting resistance, the deformation or strain of the cut surface is small, whereby a machine finished surface of high quality can be obtained.

Furthermore, as another desirable result of the vibration of the cutting tool of the cutting device along the cutting edge direction, the effective rake angle of the cutting edge becomes greater than that in the case where the vibration is imparted in a direction perpendicular to the cutting edge. For this reason, the cutting action of the cutting edge is improved. At the same time, the formation and peeling of the cut chips are promoted, and the deposability of the chips is improved.

An additional result of the vibration of the cutting tool of the cutting device along the cutting edge direction is that the cutting edge is caused by the vibration during cutting operation to undergo a motion which is the same as that for honing or dressing the cutting edge. The cutting action of the cutting edge is thereby further improved. At the same time, there is no adhesion of deposited matter to the cutting edge, and abrasive wear of the cutting edge caused by the formation and adhesion of deposited matter is prevented. Thus the cutting edge of the cutting tool can be maintained in a sharp condition for a long service time.

The above described features of utility have been afforded by the present invention which will now be described in detail with respect to preferred embodiments thereof and with reference to the accompanying drawings.

DESCRIPTION OF THE PREFERRED EMBODIMENTS

Figure 1:
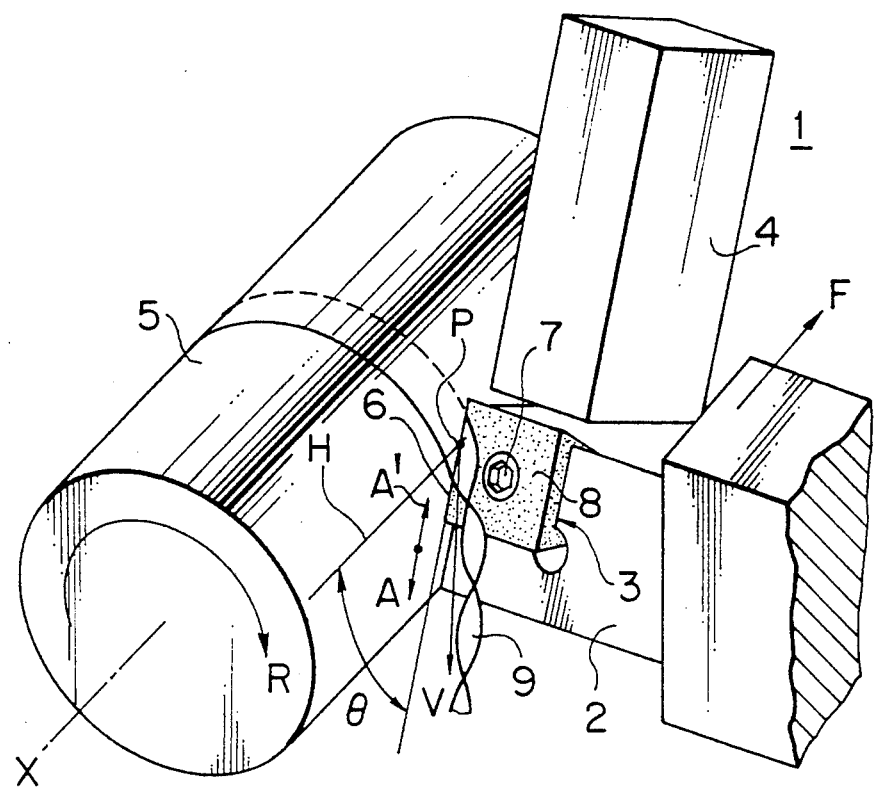
FIG. 1 is a perspective view showing a cutting device constituting a first embodiment of this invention in cutting relation to a cylindrical workpiece.

Referring to FIG. 1 illustrating a vibration cutting method according to a first embodiment of this invention, a cutting device 1 is shown in its state of cutting the outer cylindrical surface of a cylindrical workpiece 5. The cutting device 1 has a holder 2, a cutting tip 3 having a cutting edge 6 and held by the holder 2, and a pneumatic vibrator 4. The working end of the pneumatic vibrator 4 is in abutting contact with the holder 2. The cylindrical workpiece 5 is so rotatably supported that it can be rotated in the direction R about a rotational axis X. Relative to this cylindrical workpiece 5, the cutting tip 3 is held substantially at the level of a horizontal plane passing through the rotational axis X. The cutting tip 3 is required to cut the entire cylindrical outer surface of the workpiece 5 to a specific dimension. For this purpose, the cutting device 1 is so supported and adapted as to be movable in a feeding direction F parallel to the rotational axis X of the workpiece 5.

In the operation of the cutting device 1 of the above described mechanical organization, the cutting tip 3 is in cutting contact at a cutting point P with the workpiece 5. The vertically downward direction passing through this cutting point P is the cutting speed direction V of the workpiece 5. A horizontal line H passing through the cutting point P is a direction perpendicular to the cutting speed direction V. In this cutting device 1, the tip 3 is fixedly mounted on the holder 2 by means such as a screw 7. The tip 3 is thus mounted so that its cutting edge 6 is at an angle θ relative to the horizontal line H as shown in FIG. 1.

The pneumatic vibrator 4 is oriented in parallel with the cutting edge 6 and has a working end in abutting contact with the working end of the tip holder 2. This vibrator 4 is adapted to vibrate the cutting tip 3 in a direction A-A' parallel to its cutting edge 6. The angle θ of inclination of this cutting edge 6 is preferably in the range of 30 to 70 degrees. Therefore the angle between the cutting edge 6 and the cutting speed direction V is from 20 to 60 degrees. The angle θ is most desirable of the order of 45 degreeds. The tip 3 has a face 8. During the cutting operation of the tip 3, the chip 9 cut from the workpiece 5 slides along this face 8 and is discarded.

Figure 2:
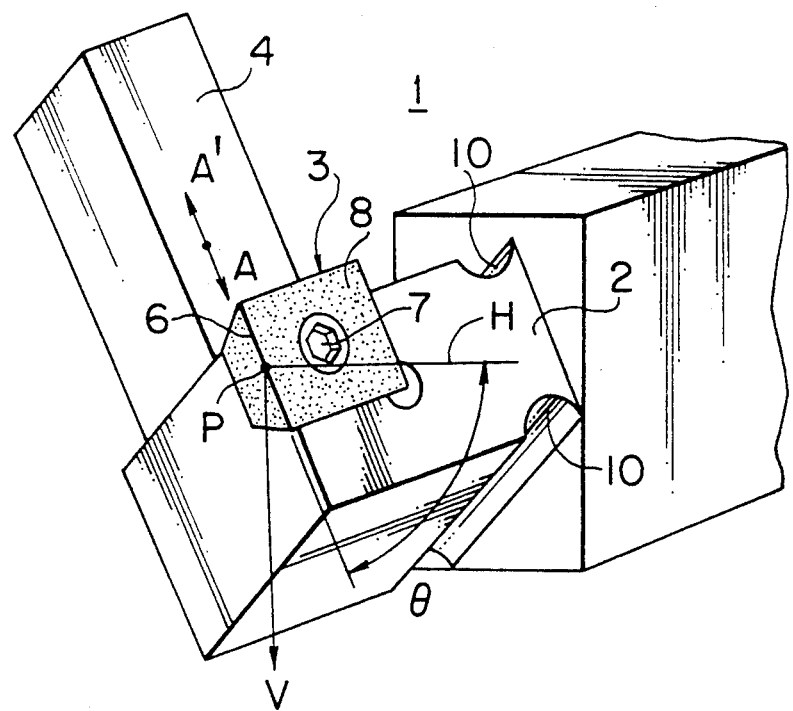
FIG. 2 is a perspective view of the same cutting device turned through approximately 90 degrees of angle about a vertical axis from the view in FIG. 1, the workpiece being deleted.

FIG. 2 shows the cutting device 1 as viewed from the side of the tip 3. In this embodiment, cutout grooves 10 are formed along portions of the holder 2 as shown in FIG. 2. These grooves 10 serve to vary the coefficient of elasticity of the holder 2, whereby the cutting edge is caused to vibrate even more effectively.

The operation, effectiveness and utility of this invention will now be described on the basis of the cutting device 1 of the above described mechanical construction.

Figure 3:
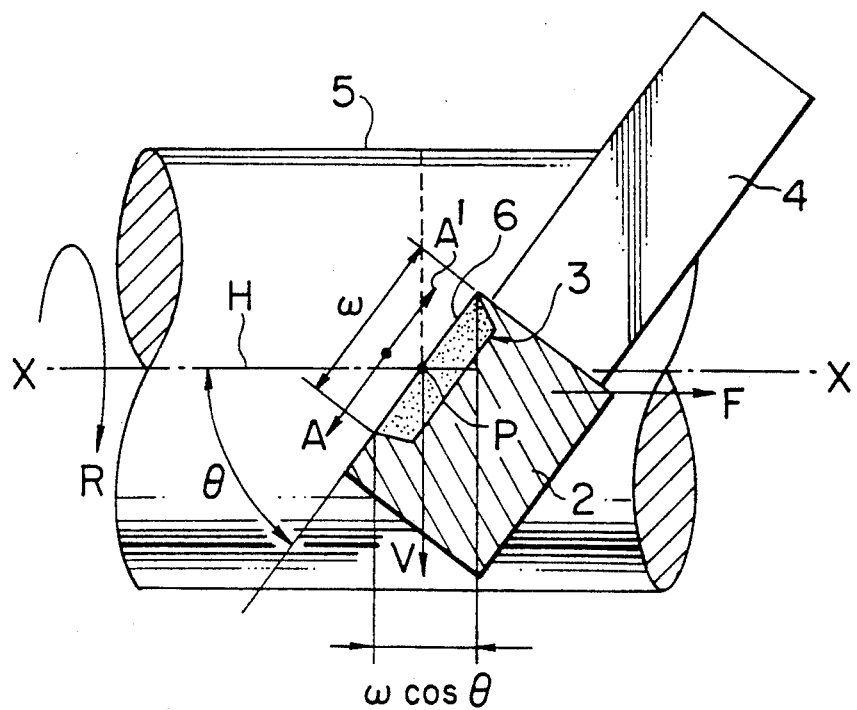
FIG. 3 is a side view, with some parts shown in section, of the same cutting device as viewed from its back side in cutting relation to the workpiece.

FIG. 3 shows the cutting device 1 and the workpiece 5 as viewed from the rear surface of the tip 3, i.e., its surface remote from its cutting edge 6. As shown, the cutting edge 6 of the tip 3 is inclined by an angle (90°−θ) relative to the cutting speed direction V. The tip 3 is caused to vibrate in a direction A-A' parallel to its cutting edge 6 by the pneumatic vibrator 4 as mentioned hereinbefore. For this reason, the cutting fluid, in a broad sense including air, can readily infiltrate to the cutting point P irrespective of the cutting speed or the velocity of vibration of the cutting edge 6. Because the cutting fluid readily reaches the cutting point P, the cutting speed is not subject to restriction due to the necessity of assuring that the cutting fluid will infiltrate to the cutting point P as was necessary heretofore. That is, the cutting speed need not be restricted by the conditional formula mentioned hereinbefore: $v<2\pi af$(- wherein: v is cutting speed; a is amplitude of vibration; and $f$ is frequency of vibration). Thus a high cutting speed v can be freely used. That is, the vibration cutting method and cutting device of this invention make possible cutting with high machining efficiency due to high cutting speed v.

Furthermore, according to this invention, the cutting edge 6 of the tip 3 has an inclination angle $(90°-\theta)$ relative to the cutting speed direction V. Moreover, the direction A-A' of vibration imparted by the vibrator 4 is not counter to the cutting speed direction V of the workpiece 5. Therefore the cutting resistance exerted by the workpiece 5 during cutting operation is small. Moreover, the power consumed for the vibration is reduced. For these reasons, a high cutting speed v can be used. At the same time, the width w of the cutting edge 6 of the tip 3 can be made large, and the feed rate of the cutting device 1 can be made high within the scope of an effective length w·cos$\theta$ of the cutting edge 6. A high feed rate will further improve the machining efficiency. In addition, since the vibration is along the cutting edge 6, extraneous vibrations do not develop in the cutting device 1 during cutting operation. Therefore machining finish surfaces of high quality can be obtained.

Still another beneficial result of the vibration of the tip 3 in the direction of its cutting edge 6 is that the effective rake angle of the cutting edge 6 becomes large. This gives rise to an improvement in the cutting action of the cutting edge 6, and the formation and separation of the chip 9 are promoted. The disposability of the chip 9 is thereby improved. A further feature of the invention is that the cutting edge 6 is caused by the vibration to undergo a motion equivalent to a honing motion thereof. For this reason, deposited materials do not adhere to the cutting edge 6. Thus abrasive wear of the cutting edge caused by the formation and adhesion of deposited materials is prevented, whereby a sharp cutting edge can be maintained over a long period.

In the above described embodiment a pneumatic vibrator is used as the vibrator. Alternatively, an ultrasonic longitudinal vibration horn of the electrostriction or magnetostriction type can also be used as a vibrator.

Figure 4:
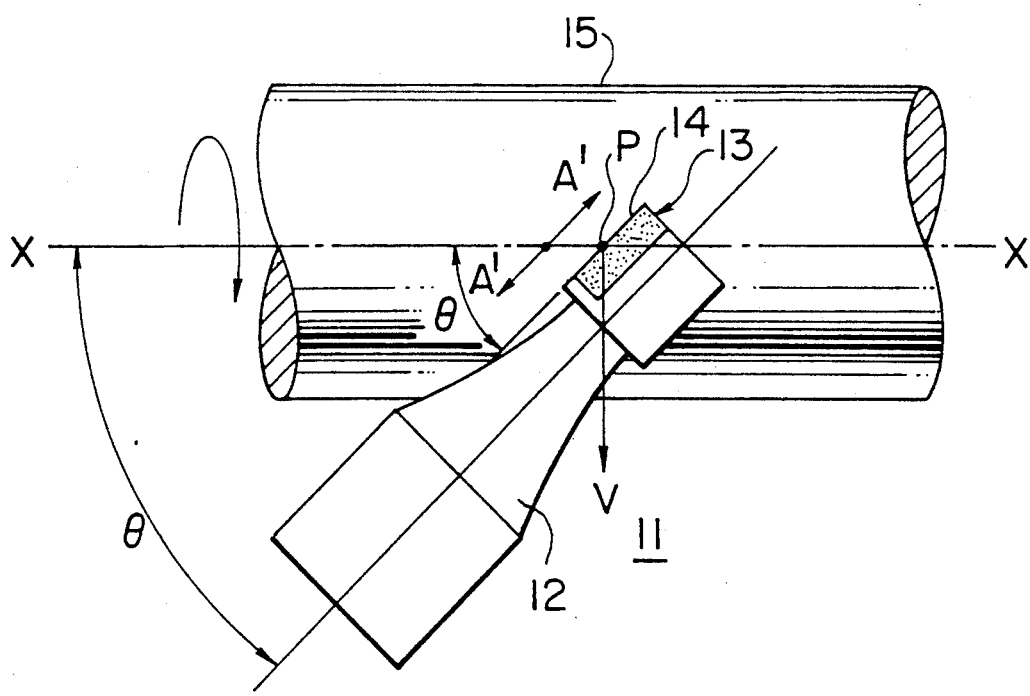
FIG. 4 is a side view of a cutting device constituting a second embodiment of the invention in which an ultrasonic longitudinal vibration horn is used as a vibrator.

FIG. 4 illustrates a cutting device 11 constituting a second embodiment of the present invention. In this cutting device 11, an ultrasonic longitudinal vibration horn 12 of the electrostriction type or the magnetostriction type is used as the vibrator. A cutting tip 13 is mounted on the working end of this horn 12 in a manner such that the cutting edge 14 of the tip 13 will be parallel to the axis of the horn 12. At the same time, the tip 13 is thus mounted with an orientation such that its cutting edge 14 is inclined at an angle $\theta$ relative to the horizontal line H which is perpendicular to the cutting speed direction V of the workpiece 15. In this embodiment, the horn 12 undergoes longitudinal vibration. Accordingly the tip 13 vibrates in a direction parallel to its cutting edge 14, that is, in a state of inclination of the angle $(90°-\theta)$ relative to the cutting speed direction of the workpiece 15.

According to this embodiment, the vibration utilized is of a frequency in the ultrasonic region. Thus, the frequency is high, whereby advantageous effects such as reduction of frictional coefficient become conspicuous. Furthermore, the cutting edge 14 is provided directly on the working end of the ultrasonic longitudinal vibration horn 12. For this reason, the efficiency of the vibration transmission system is high.

Figure 5:
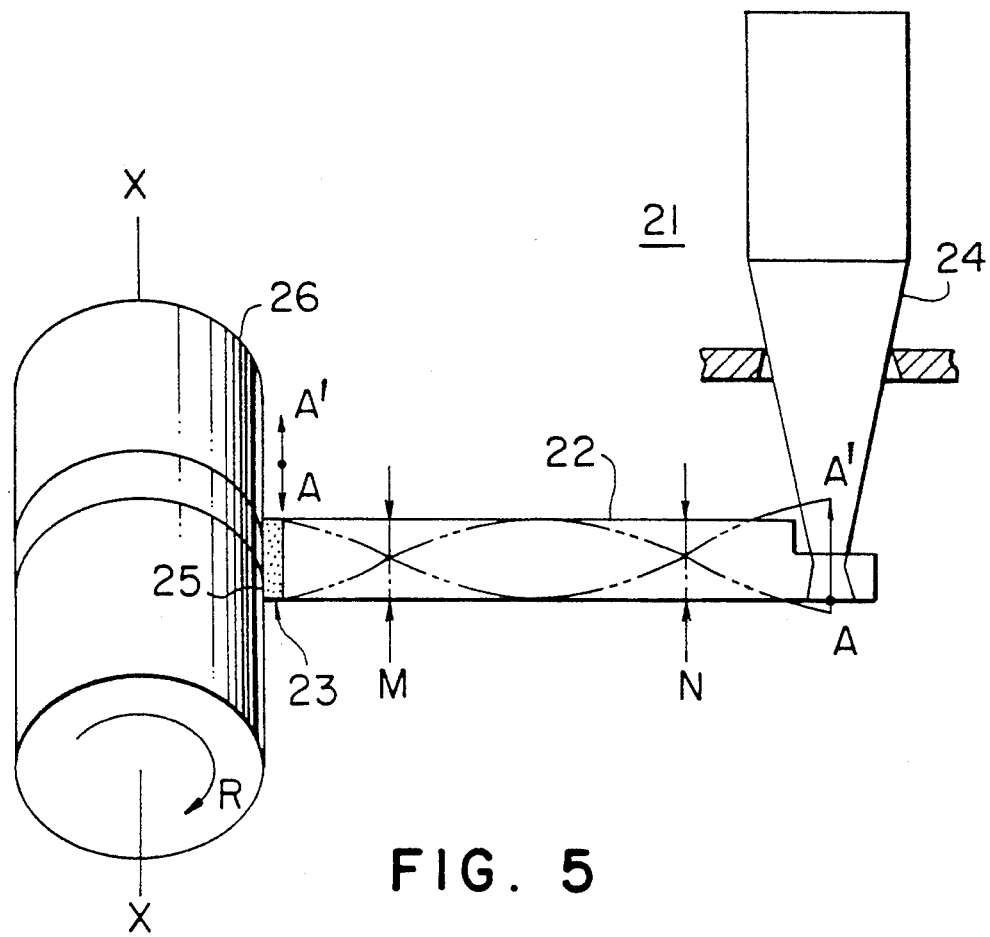
FIG. 5 is a plan view of an ultrasonic longitudinal vibration horn used in a cutting device constituting a third embodiment of the invention.

A cutting device according to a third embodiment of this invention is shown in FIG. 5. In this cutting device 21, the above described ultrasonic longitudinal vibration horn is used as the vibrator. This horn 24 is of the electrostriction type or the magnetostriction type. The horn 24 is so supported that its working end is in abutting contact with the rear or proximal end of an elongated tip holder 22. On the other or working end of this holder 22 is mounted a cutting tip 23. The cutting edge 25 of this tip 23 is inclined relative to the cutting speed direction of the workpiece 26 similarly as in the preceding first and second embodiments of the invention. In FIG. 5, the cutting edge 25 is shown as being parallel to the plane of the drawing paper sheet, and the workpiece 26 is shown in its state of inclination relative to the drawing paper sheet.

In this third embodiment of the invention, the rear end of the holder 22 is vibrated by the use of an ultrasonic longitudinal vibration horn 24. The holder 22 is so designed in relation to the operation of the horn 24 that the tip 23 is positioned at a loop (or point of maximum amplitude) of the vibration wave pattern and thereby vibrates with maximum amplitude. By thus utilizing the loop and node of the vibration of the holder 22, the tip 23 can be vibrated with good efficiency. The parts of the holder 22 at the nodes M and N, of zero amplitude, are fixed to the tool rest (not shown) of the machine tool.

Figure 6:
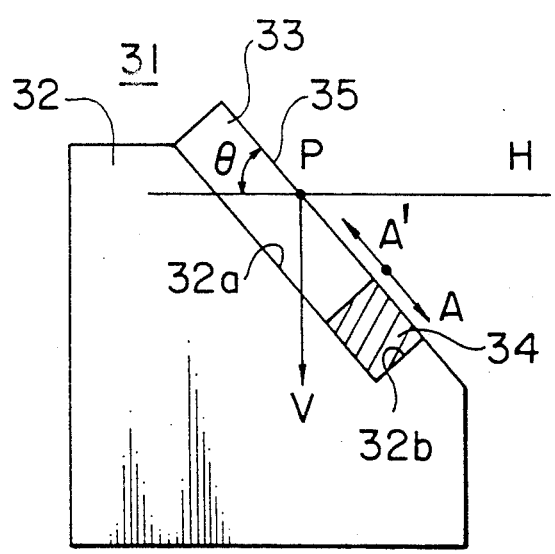
FIG. 6 is a front view of a cutting device in which a piezoelectric element is used as a vibrator, and which constitutes a fourth embodiment of the invention.

A cutting device according to a fourth embodiment of the invention is shown in FIG. 6. In this cutting device 31, a piezoelectric element 34 is used as the vibrator. In the cutting device 31 of this embodiment, a holder 32 has at its working end a recess 32a with a ledge or step part 33b. A cutting tip 33 is mounted rotatably in this recess 32a. A piezoelectric element 34 is interposed between the lower end (as viewed in FIG. 6) of the tip 33 and the step part 32b. Vibration of the piezoelectric element 34 causes the tip 33 to vibrate in the direction A-A' along the cutting edge 35 of the tip 33. As showing FIG. 6, this cutting edge 35 is inclined at an angle $\theta$ relative to a horizontal line H which is perpendicular to the cutting speed direction V of the workpiece (not shown).

In the cutting device 31 of this embodiment, the holder 32 does not vibrate, and only the tip 33 vibrates. As a result, the power efficiency for generating vibration is high.

In the foregoing description, embodiments in which the cutting edges are straight-line edges and the faces are planar have been described. The shape of the cutting tip of the cutting device of this invention, however, is not thus limit. Examples of cutting devices according to this invention wherein the cutting edges are curved will now be described.

Figure 7:
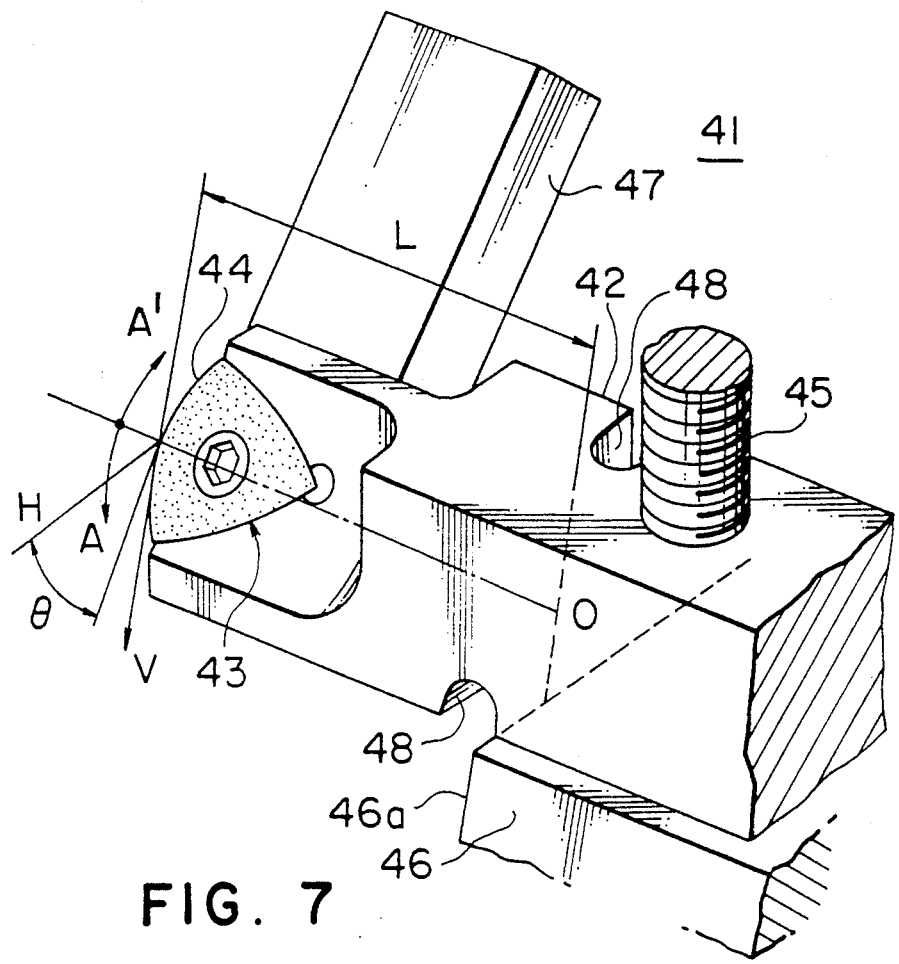
FIG. 7 is a perspective view showing a cutting device in which a cutting tip having a curved cutting edge is used, and which constitutes a fifth embodiment of the invention.

A cutting device according to a fifth embodiment of the invention, wherein the cutting edge of the tip is curved, is shown in FIG. 7. In this cutting device 41, a tip 44 having a curved cutting edge 43 is mounted on the working end of a holder 42. The other or proximal end of the holder 42 is fixed by a screw 45 to a tool rest 46. The portion of the holder 42 including its working end thus extends as a free end beyond the end face 46a of the tool rest 46. The length L of this extending free end of the holder is made equal to the radius of curvature of the cutting edge 43 of the tip 44. A vibrator 47 of its working end is in abutting contact with the portion near the working end of the holder 42. A cutout groove 48 is formed in the lower part of the holder 42 near the end face 46a of the tool rest 46. This cutout groove 48 serves to impart a shape to the free end of the holder 42 such that it can vibrate effectively with low vibrating power. The cutting edge 43 of the tip 44 is inclined at an angle $\theta$ relative to a horizontal line H which is perpendicular to the cutting speed direction V of the workpiece (not shown). The vibrator 47 is so set that its vibration direction is parallel to this inclined direction of the cutting edge 43.

As mentioned above, the length L of the free end of the holder 42 is equal to the radius of curvature of the cutting edge 43. For this reason, when the free end of the holder 42 is caused to vibrate by the vibrator 47, the tip 44 vibrates in the direction A-A' along its cutting edge 43. That is, in the cutting device 41 of the instant example, the tip 44 vibrates along the curved line of its cutting edge 43. For this reason, this cutting device is capable of vibration cutting with high efficiency the inner surface of planar or cylindrical shape of a workpiece.

Figure 8:
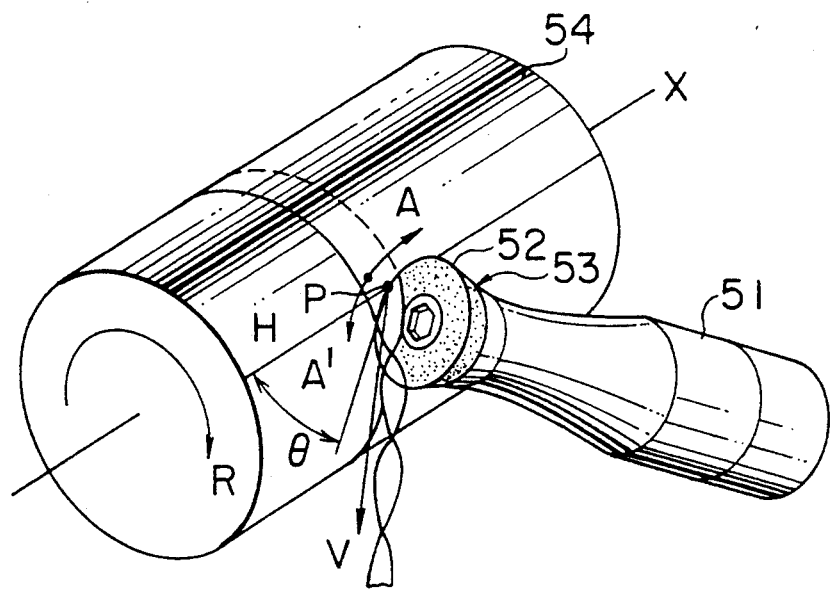
FIG. 8 is a perspective view of a cutting device according to a sixth embodiment of the invention in which an ultrasonic torsional vibration device is used as the vibrator.

FIG. 8 shows a sixth embodiment of the invention in which an ultrasonic torsional vibration device is used as a vibrator. A cutting tip 53 having a circular cutting edge 52 is mounted on the working end of this torsional vibration device 51. This tip 53 is so formed and supported that the tangent to the cutting edge 52 at the cutting point P is inclined at an angle $\theta$ relative to a horizontal line H which is perpendicular to the cutting speed direction V of the workpiece 54.

In the operation of this embodiment, the ultrasonic torsional vibration device 51 produces a torsional vibration which causes the tip 53 to vibrate in the circumferential direction A-A' of its cutting edge 52. Thus vibration cutting is carried out. Therefore, vibration cutting of the inner surface of a planar or cylindrical shape of a workpiece can be carried out with high efficiency.

Figure 9:
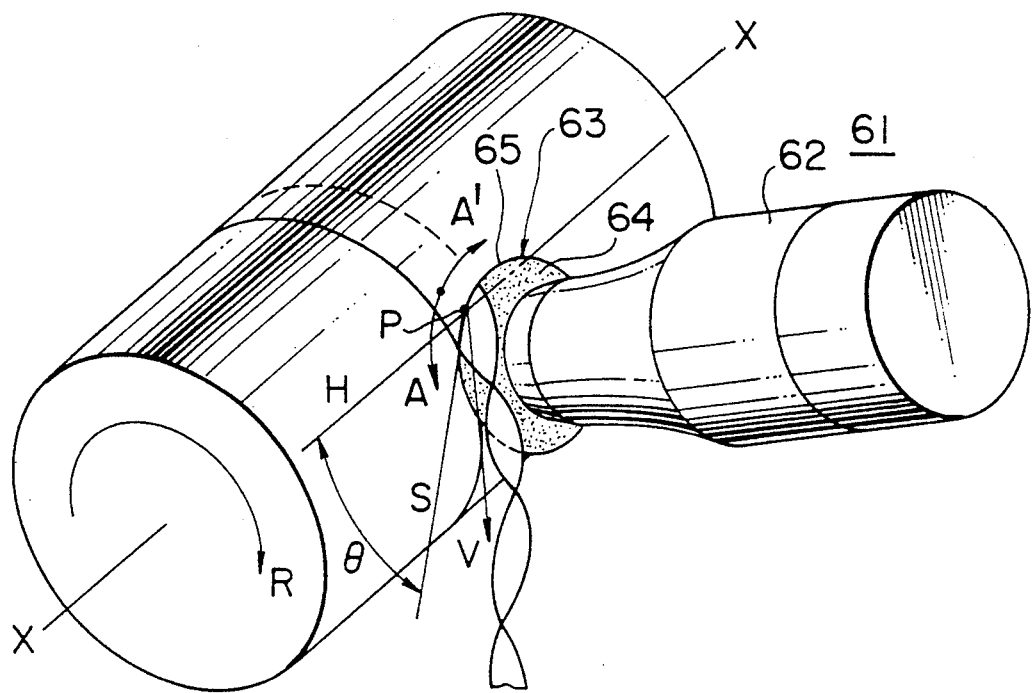
FIG. 9 is a perspective view of a cutting device according to a seventh embodiment of the invention in which a tip having a curved-surface face is used.

A cutting device according to a seventh embodiment of the invention in which a tip having a curved-surface face is used is shown in FIG. 9. In this cutting device 61, an ultrasonic torsional vibration device 62 is used as a vibrator similarly as in the preceding sixth embodiment of the invention. A tip 63 having a curved-surface face 64 is mounted on the working end of this vibration device 62. This tip 63 is so formed and supported that the tangent S to its cutting edge 65 at the point P thereof of maximum protrusion is inclined to form an angle $\theta$ with a horizontal line H perpendicular to the cutting speed direction V of the workpiece.

In the operation of this cutting device 61, the ultrasonic torsional vibration device 62 causes the tip 63 to vibrate along its cutting edge 65 in its circumferential direction A-A'. Thus vibration cutting with high efficiency is carried out similarly as in the case of the preceding sixth embodiment of the invention. The use of a tip with a face that is a convex curved surface results in advantages such as an improvement in the strength of the cutting edge.

Figure 10:
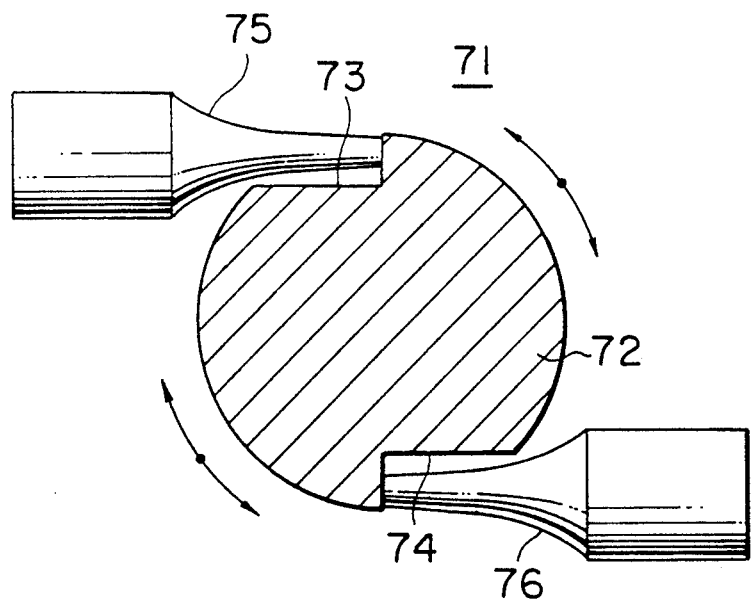
FIG. 10 is a cross-sectional view of a tip holder in a cutting device in which torsional vibration is generated by using a pair of longitudinal vibrators.

In addition to the use of an ultrasonic torsional vibration device as described above, there are other methods of imparting torsional vibration. One such method wherein use is made of a cutting device in which a pair of vibrators for producing vibration in their axial directions is indicated in FIG. 10. In this method, the cutting device 71 has a holder 72 of the shape of a solid circular cylinder. Two cutouts 73 and 74 each having a stepped part are formed in the outer cylindrical surface of this holder 72 at respective positions mutually spaced apart 180 degrees of angle. A pair of vibrators 75 and 76, which produce vibrations in their axial directions, are so supported that their working ends abut against the stepped parts of respective cutouts 73 and 74 thereby to impart vibrations to the holder 72 in tangential directions thereof. Thus torsional vibration is imparted to the holder 72. The vibratory operations of these vibrators 75 and 76 are so controlled relatively that when the vibration of one vibrator is at the crest of its waveform, that of the other vibrator will be at the valley bottom of its waveform. In this manner the holder 72 is caused effectively to undergo torsional vibration.

Figure 11:
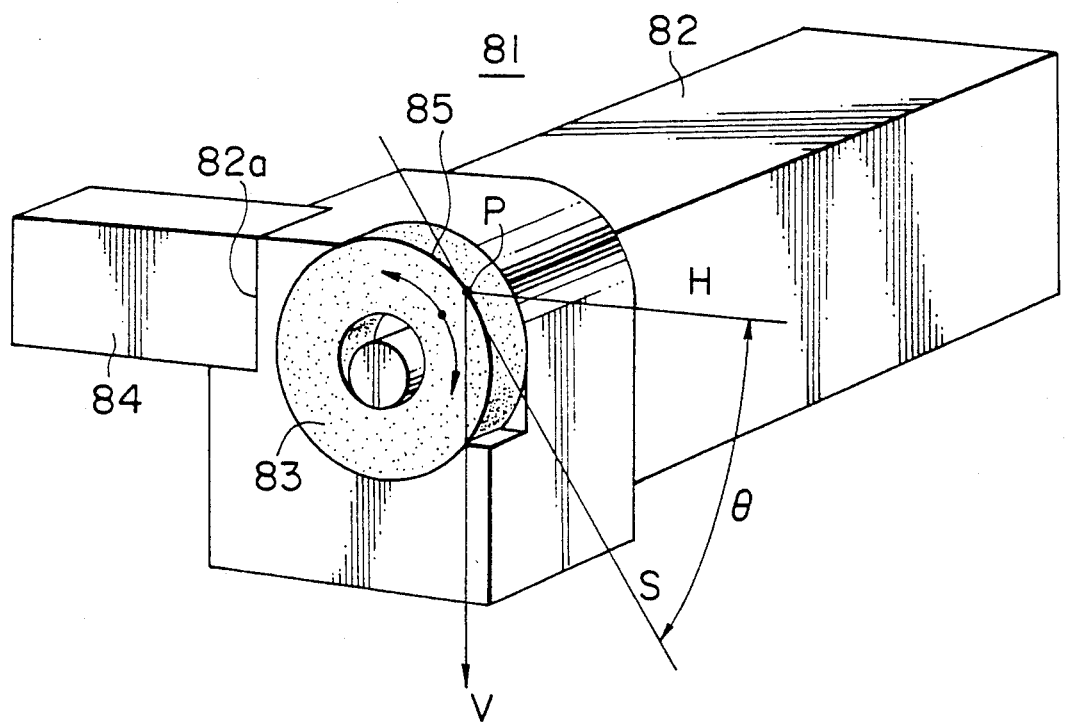
FIG. 11 is a perspective view of a cutting device according to an eighth embodiment of the invention in which a circular tip is caused to vibrate along its cutting edge.
Figure 12:
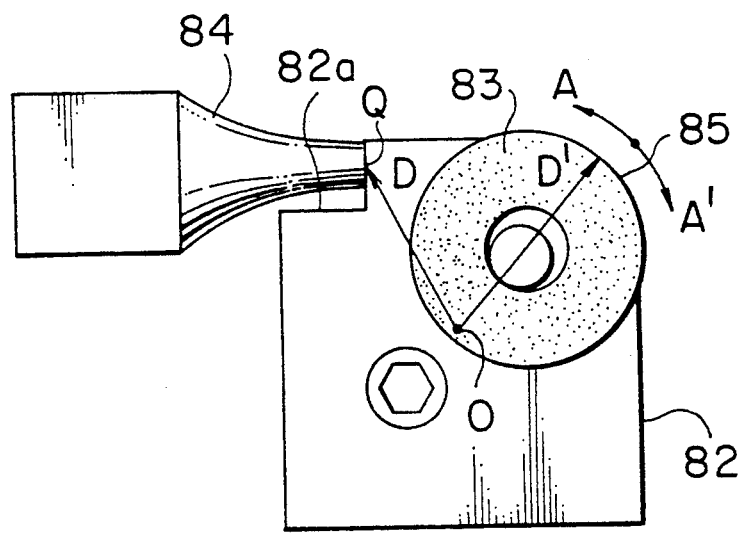
FIG. 12 is a view in the axial direction of the tip of the cutting device shown in FIG. 11.

A vibration cutting device according to an eighth embodiment of the invention is illustrated in FIGS. 11 and 12. In this embodiment, a circular tip is vibrated along its cutting edge. Referring first to FIG. 11, the cutting device 81 has a bar-shaped holder 82. At the working end of this holder 82, a circular tip 83 is so mounted that its cutting edge 85 lies within a plane which is perpendicular to the axis of the holder 82. As shown in FIG. 12, the center of this circular tip 83 is offset from the center 0 of the holder 82. In this cutting device 81, the cutting point P is so set that the tangent S passing therethrough will be at an angle $\theta$ relative to a horizontal line H perpendicular to the cutting speed direction V. At one part of the working end of the holder 82, a recess 82a having a stepped part is formed. A vibrator 84 for producing vibration longitudinal direction is so supported that its working end is in abutting contact with the stepped part of this recess 82a. The pertinent dimensions and configuration of the parts of this cutting device 81 are so selected that the distances D and D' shown in FIG. 12 will be substantially equal. The distance D is that from the center 0 of the holder 82 to the pressing point Q at which the vibrator 84 presses against the holder 82. The distance D' is that from the center 0 of the holder 82 to the cutting edge 85 of the circular tip 83.

In the operation of the cutting device 81 of the above described construction, the longitudinal vibration of the vibrator 84 causes the circular tip 83 to vibrate along its cutting edge 85 in the direction A-A'. Thus cutting is efficiently carried out.

Figure 13:
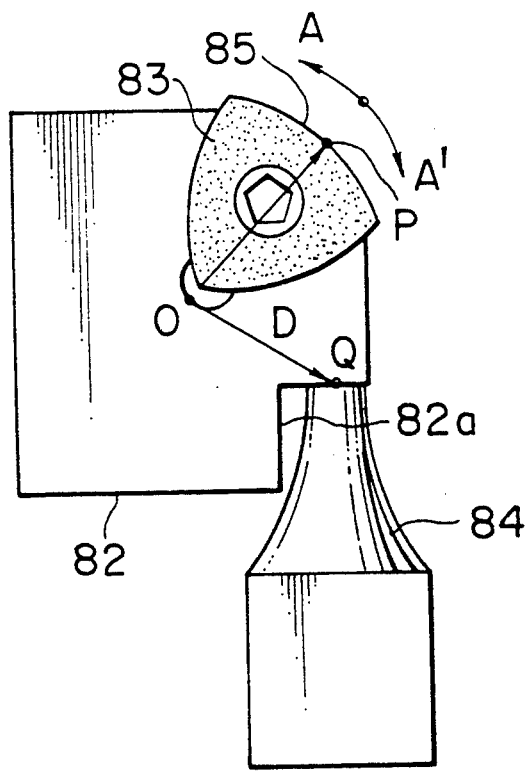
FIG. 13 is a view in the axial direction of the tip of a cutting device which is a modification of the eighth embodiment of the invention.

A cutting device according to a modification of the eight embodiment of the invention is shown in FIG. 13. In this cutting device, a tip 83 having a curved cutting edge instead of a circular tip is used. Parts in FIG. 13 which are the same as or equivalent to corresponding parts in FIG. 12 are designated by the same reference numerals and characters. In the instant modification, also, the distance D from the center 0 of the holder 82 to the pressing point Q of the vibrator 84 and the distance D' from the center 0 to the cutting point Q of the tip 83 are substantially equal. Accordingly, similarly as in the eight embodiment of the invention, the tip 83 can be vibrated along its cutting edge 85 with a simple construction of the cutting device. Thus a cutting device having the high effectiveness of the invention can be obtained.

The vibration machining method and cutting device of the present invention have the following features of merit and effectiveness.

In the cutting device of this invention, the cutting edge of the cutting tool or tip is inclined at a specific angle relative to the cutting speed direction of the workpiece. Furthermore, cutting is carried out as the cutting tool or tip is vibrated along its cutting edge. For these reasons, the cutting fluid can readily reach the cutting point. Accordingly, there is no necessity of restricting the cutting speed according to the restrictive relationship $v < 2\pi a f$ (where: v is the cutting speed; a is the vibration amplitude; and f is the vibration frequency) in order to enable the cutting fluid to infiltrate to the cutting point. Hence, a high cutting speed can be freely attained. Furthermore, the resistance to cutting and the vibration power are low. For these reasons, the width of the cutting edge can be made large, and the feed rate can be made large within the effective length of the cutting edge thereby to increase the machining efficiency of cutting.

Another feature of this invention is that the cutting tool or tip of the cutting device is not vibrated in parallel to the cutting speed direction. For this reason, the power required for vibration is low, and the cutting resistance is also low. Therefore, a vibration cutting method and cutting device of high power utilization efficiency is obtained. Furthermore, since the cutting resistance is low, the deformation of the cut surface is small, and machining finish surfaces of high quality can be obtained.

A further feature of this invention is that the cutting tool or tip of the cutting device is caused to vibrate along its cutting edge as it cuts. For this reason, the effective rake angle of the cutting edge becomes large to improve the cutting action. At the same time, the vibration of the cutting edge produces an effect of honing the cutting edge, and various other advantages such as prevention of adhesion of deposited matter on the cutting edge, sharpening of the cutting edge, prolonging of the serviceable life of the tool, and improvement of the deposability of cut chips are afforded.

What is claimed is:

1. A vibration machining method including feeding a cutting edge of a cutting tool relative to a workpiece so as to produce a cutting speed between the cutting edge and the workpiece, and carrying out cutting of said workpiece as said cutting tool is vibrated, said method comprising the steps of:
    positioning said cutting tool such that said cutting edge is inclined at a specific angle relative to the direction of said cutting speed; and
    vibrating said cutting tool in a direction along said cutting edge.

2. A vibration machining method according to claim 1, wherein said specific angle is from 20 to 60 degrees.

3. A vibration machining method according to claim 1, wherein said specific angle is of the order of 45 degrees.

4. A vibration machining method according to claim 1, wherein said cutting edge is of the shape of a straight line, and said cutting tool is vibrated in the direction along said straight line.

5. A vibration machining method according to claim 1, wherein said cutting edge is of the shape of a curved line, and said cutting tool is vibrated along said curved line.

6. A vibration machining method according to claim 5, wherein said curved line is an arc of a circle.

7. A cutting device of a machining tool, said cutting device being provided with means for supporting a workpiece, a cutting tool having a cutting edge for cutting said workpiece, means for moving the workpiece and cutting tool relatively to each other to produce a cutting speed between the cutting edge and the workpiece and to carry out cutting, and vibration-imparting means for vibrating said cutting tool during the cutting:
    said cutting device comprising support means for so supporting said cutting tool that said cutting edge thereof is inclined at a specific angle relative to said direction of the cutting speed; and said vibration-imparting means being means for vibrating said cutting tool in a direction along said cutting edge thereof.

8. A cutting device according to claim 7, wherein said cutting tool is a cutting tip having said cutting edge, and said support means includes a holder member having a free front end and a rear end, said cutting tip being fixed to the front end of said holder member.

9. A cutting device according to claim 8, wherein said vibration-imparting means is in abutting contact with the holder member in a manner to impart vibration to the holder member in a direction parallel to the cutting edge of the cutting tip.

10. A cutting device according to claim 9, wherein said cutting edge is of the shape of a straight line.

11. A cutting device according to claim 9, wherein said cutting edge is of the shape of a curved line, and said vibration-imparting means imparts to the holder member a vibration along said curved line.

12. A cutting device according to claim 9, wherein said vibration-imparting means is in abutting contact with said front end of the holder member, and said rear end of the holder member is fixed stationarily.

13. A cutting device according to claim 9, wherein said vibration-imparting means is in abutting contact with said rear end of the holder member, and the holder member is fixed stationarily at a part thereof between said front and rear ends thereof.

14. A cutting device according to claim 7, wherein said cutting tool is a cutting tip having said cutting edge and said support means includes a holder member having a front end and a rear end, and wherein said cutting tip is movably supported on said front end of the holder member and said vibration-imparting means is interposed between the holder member and the cutting tip.

15. A cutting device according to claim 14, wherein said vibration-imparting means is a piezoelectrtic element.

16. A cutting device according to claim 12, wherein said vibration-imparting means is a longitudinal vibration means.

17. A cutting device according to claim 12, wherein said cutting edge of the cutting tip is of the shape of an arc of a circle, and said vibration-imparting means is a longitudinal vibration means in abutting contact with the holder member and is so adapted as to convert the longitudinal vibration thereof into vibration along said arc of a circle of the cutting edge.

18. A cutting device according to claim 7, wherein said cutting tool is a cutting tip having said cutting edge, and said vibration-imparting means constitutes said supported means, the cutting tip being supported on a front working end of the vibration-imparting means.

19. A cutting device according to claim 18, wherein said vibration-imparting means is a longitudinal vibration means.

20. A cutting device according to claim 18, wherein said vibration-imparting means is a torsional vibration means.

21. A cutting device according to claim 20, wherein said torsional vibration-means extends in a direction substantially along the workpiece.

22. A cutting device according to claim 20, wherein said torsional vibration means extends in a direction substantially perpendicular to the axis of rotation of the workpiece.

* * * * *